US009323981B2

(12) United States Patent
Kasahara et al.

(10) Patent No.: US 9,323,981 B2
(45) Date of Patent: Apr. 26, 2016

(54) FACE COMPONENT EXTRACTION APPARATUS, FACE COMPONENT EXTRACTION METHOD AND RECORDING MEDIUM IN WHICH PROGRAM FOR FACE COMPONENT EXTRACTION METHOD IS STORED

(71) Applicant: CASIO COMPUTER CO., LTD., Shibuya-ku, Tokyo (JP)

(72) Inventors: Hirokiyo Kasahara, Fussa (JP); Keisuke Shimada, Hamura (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 150 days.

(21) Appl. No.: 14/051,236

(22) Filed: Oct. 10, 2013

(65) Prior Publication Data

US 2014/0140624 A1    May 22, 2014

(30) Foreign Application Priority Data

Nov. 21, 2012  (JP) .................................. 2012-254824

(51) Int. Cl.
G06K 9/46      (2006.01)
G06K 9/00      (2006.01)

(52) U.S. Cl.
CPC ........ G06K 9/00281 (2013.01); G06K 9/00248 (2013.01)

(58) Field of Classification Search
None
See application file for complete search history.

(56) References Cited

U.S. PATENT DOCUMENTS

| 5,748,776 | A * | 5/1998 | Yoshida ........................ 382/195 |
| 6,154,559 | A * | 11/2000 | Beardsley .............. A61B 3/113 340/576 |
| 6,529,630 | B1 * | 3/2003 | Kinjo ............................ 382/190 |
| 8,885,882 | B1 * | 11/2014 | Yin ........................... G06F 3/00 382/103 |
| 8,903,123 | B2 * | 12/2014 | Tsurumi et al. ............... 382/103 |
| 2002/0012454 | A1 * | 1/2002 | Liu ..................... G06K 9/00201 382/118 |
| 2003/0169907 | A1 * | 9/2003 | Edwards ............ G06K 9/00248 382/118 |
| 2004/0021779 | A1 * | 2/2004 | Yano .......................... 348/222.1 |
| 2004/0119851 | A1 * | 6/2004 | Kaku ................. G06K 9/00248 348/239 |
| 2004/0136592 | A1 * | 7/2004 | Chen .................. G06K 9/00597 382/190 |

(Continued)

FOREIGN PATENT DOCUMENTS

JP          2004-145625 A        5/2004

*Primary Examiner* — Chan Park
*Assistant Examiner* — Mia M Thomas
(74) *Attorney, Agent, or Firm* — Holtz, Holtz & Volek PC

(57) ABSTRACT

Disclosed is a face component extraction apparatus including an eye detection unit which detects a plurality of combinations of eye regions, each combination forming a pair, a first calculation unit which calculates a first evaluation value for each pair of eye regions, a fitting unit which fits a plurality of extraction models for extracting a plurality of face components in the image based on a number of pairs of eye regions whose first evaluation values are equal to or greater than a predetermined value, a second calculation unit which calculates a second evaluation value for each of a number of pairs of eye regions, and a deciding unit which decides a fitting mode of the plurality of extraction models to be fitted by the fitting unit based on calculation results of a number of second evaluation values by the second calculation unit.

8 Claims, 6 Drawing Sheets

(56) References Cited

U.S. PATENT DOCUMENTS

| | | | |
|---|---|---|---|
| 2004/0239509 A1* | 12/2004 | Kisacanin | A61B 5/18 340/575 |
| 2005/0041867 A1* | 2/2005 | Loy et al. | 382/190 |
| 2005/0063568 A1* | 3/2005 | Sun | G06K 9/00234 382/117 |
| 2005/0162419 A1* | 7/2005 | Kim et al. | 345/419 |
| 2005/0220347 A1* | 10/2005 | Enomoto | G06K 9/00248 382/190 |
| 2005/0232482 A1* | 10/2005 | Ikeda et al. | 382/167 |
| 2005/0232490 A1* | 10/2005 | Itagaki | G06K 9/0061 382/190 |
| 2006/0126940 A1* | 6/2006 | Kim | G06K 9/00597 382/190 |
| 2006/0204106 A1* | 9/2006 | Yamaguchi | 382/203 |
| 2007/0014433 A1* | 1/2007 | Yano | G06K 9/6256 382/103 |
| 2007/0031033 A1* | 2/2007 | Oh | G06K 9/00228 382/167 |
| 2007/0165951 A1* | 7/2007 | Akahori et al. | 382/195 |
| 2007/0230797 A1* | 10/2007 | Hisanaga | A61B 3/113 382/195 |
| 2008/0225155 A1* | 9/2008 | Ebato et al. | 348/333.05 |
| 2008/0226139 A1* | 9/2008 | Suzuki et al. | 382/117 |
| 2008/0298643 A1* | 12/2008 | Lawther | G06F 17/30256 382/118 |
| 2009/0232400 A1* | 9/2009 | Terayoko | 382/195 |
| 2010/0002909 A1* | 1/2010 | Lefevre | G06F 3/04815 382/103 |
| 2010/0007665 A1* | 1/2010 | Smith | G06T 13/40 345/473 |
| 2010/0111408 A1* | 5/2010 | Matsuhira | G06T 3/4038 382/164 |
| 2011/0170785 A1* | 7/2011 | Ushijima et al. | 382/195 |
| 2012/0121133 A1* | 5/2012 | Park et al. | 382/103 |
| 2012/0201468 A1* | 8/2012 | Oami et al. | 382/199 |
| 2012/0309520 A1* | 12/2012 | Evertt et al. | 463/31 |
| 2012/0314957 A1* | 12/2012 | Narikawa | 382/195 |
| 2013/0015946 A1* | 1/2013 | Lau | G07C 9/00 340/5.2 |
| 2013/0202159 A1* | 8/2013 | Jeon et al. | 382/116 |
| 2013/0242127 A1* | 9/2013 | Kasahara | H04N 5/23219 348/222.1 |
| 2013/0251267 A1* | 9/2013 | Kafuku | G06T 11/60 382/195 |
| 2013/0343656 A1* | 12/2013 | Shimada | G06K 9/00268 382/195 |
| 2014/0233858 A1* | 8/2014 | Yamamoto | G06T 11/60 382/195 |
| 2015/0161435 A1* | 6/2015 | Jung | G06K 9/00281 382/103 |

* cited by examiner

FACE COMPONENT EXTRACTION APPARATUS, FACE COMPONENT EXTRACTION METHOD AND RECORDING MEDIUM IN WHICH PROGRAM FOR FACE COMPONENT EXTRACTION METHOD IS STORED

BACKGROUND OF THE INVENTION

1. Field of the Invention

The present invention relates to a face component extraction apparatus, a face component extraction method and a recording medium in which a program for the face component extraction method is stored.

2. Description of the Related Art

Conventionally, there is known a portrait creation apparatus which creates a portrait by using feature points of face components such as eyes, nose, mouth, ears and face contour (for example, see JP 2004-145625).

When an extraction model, which is for extracting face components such as eyes and mouth from an image, is to be fitted in the image, it is preferable to use the positions of eyes in the face region of the image as the reference in order to appropriately fit the extraction model. However, if a person in the image is wearing a pair of glasses with thick frame of dark color such as a pair of dark rimmed glasses, the eyes cannot be detected appropriately, and as a result, there is a possibility that the extraction model cannot be fitted appropriately.

SUMMARY OF THE INVENTION

In view of the above, an object of the present invention is to provide a face component extraction apparatus and a face component extraction method which can appropriately extract face components from an image and a recording medium in which a program for the face component extraction method is stored.

According to an embodiment of the present invention, there is provided a face component extraction apparatus including an eye detection unit which detects a plurality of combinations of eye regions, each combination forming a pair, in a face region in an image, a first calculation unit which calculates a first evaluation value for each pair of eye regions detected by the eye detection unit, the first calculation unit being related to likeness to eyes, a fitting unit which fits a plurality of extraction models for extracting a plurality of face components that constitute a face in the image based on a number of pairs of eye regions whose first evaluation values calculated by the first calculation unit are equal to or greater than a predetermined value, a second calculation unit which calculates a second evaluation value for each of a number of pairs of eye regions, the second evaluation value being related to a fitting condition of the plurality of extraction models which are fitted by the fitting unit, and a deciding unit which decides a fitting mode of the plurality of extraction models to be fitted by the fitting unit based on calculation results of a number of second evaluation values by the second calculation unit.

According to an embodiment of the present invention, there is provided a face component extraction method using a face component extraction apparatus including detecting a plurality of combinations of eye regions, each combination forming a pair, in a face region in an image, first calculating of a first evaluation value for each pair of eye regions detected by the eye detection unit, the first calculation unit being related to likeness to eyes, fitting a plurality of extraction models for extracting a plurality of face components which constitute a face in the image based on a number of pairs of eye regions whose first evaluation values calculated in the first calculating are equal to or greater than a predetermined value, second calculating of a second evaluation value for each of a number of pairs of eye regions, the second evaluation value being related to a fitting condition of the plurality of extraction models which are fitted in the fitting, and deciding a fitting mode of the plurality of extraction models to be fitted in the fitting based on calculation results of a number of second evaluation values calculated in the second calculating.

According to an embodiment of the present invention, there is provided a non-transitory computer readable recording medium having a program stored thereon that can be read by a computer in a face component extraction apparatus, the program making the computer function as an eye detection unit which detects a plurality of combinations of eye regions, each combination forming a pair, in a face region in an image, a first calculation unit which calculates a first evaluation value for each pair of eye regions detected by the eye detection unit, the first calculation unit being related to likeness to eyes, a fitting unit which fits a plurality of extraction models for extracting a plurality of face components which constitute a face in the image based on a number of pairs of eye regions whose first evaluation values calculated by the first calculation unit are equal to or greater than a predetermined value, a second calculation unit which calculates a second evaluation value for each of a number of pairs of eye regions, the second evaluation value being related to a fitting condition of the plurality of extraction models which are fitted by the fitting unit, and a deciding unit which decides a fitting mode of the plurality of extraction models to be fitted by the fitting unit based on calculation results of a number of second evaluation values by the second calculation unit.

BRIEF DESCRIPTION OF THE DRAWINGS

The above and other objects, advantages and features of the present invention will become more fully understood from the detailed description given hereinbelow and the appended drawings which are given by way of illustration only, and thus are not intended as a definition of the limits of the present invention, and wherein.

DETAILED DESCRIPTION OF THE INVENTION

Figure 1:
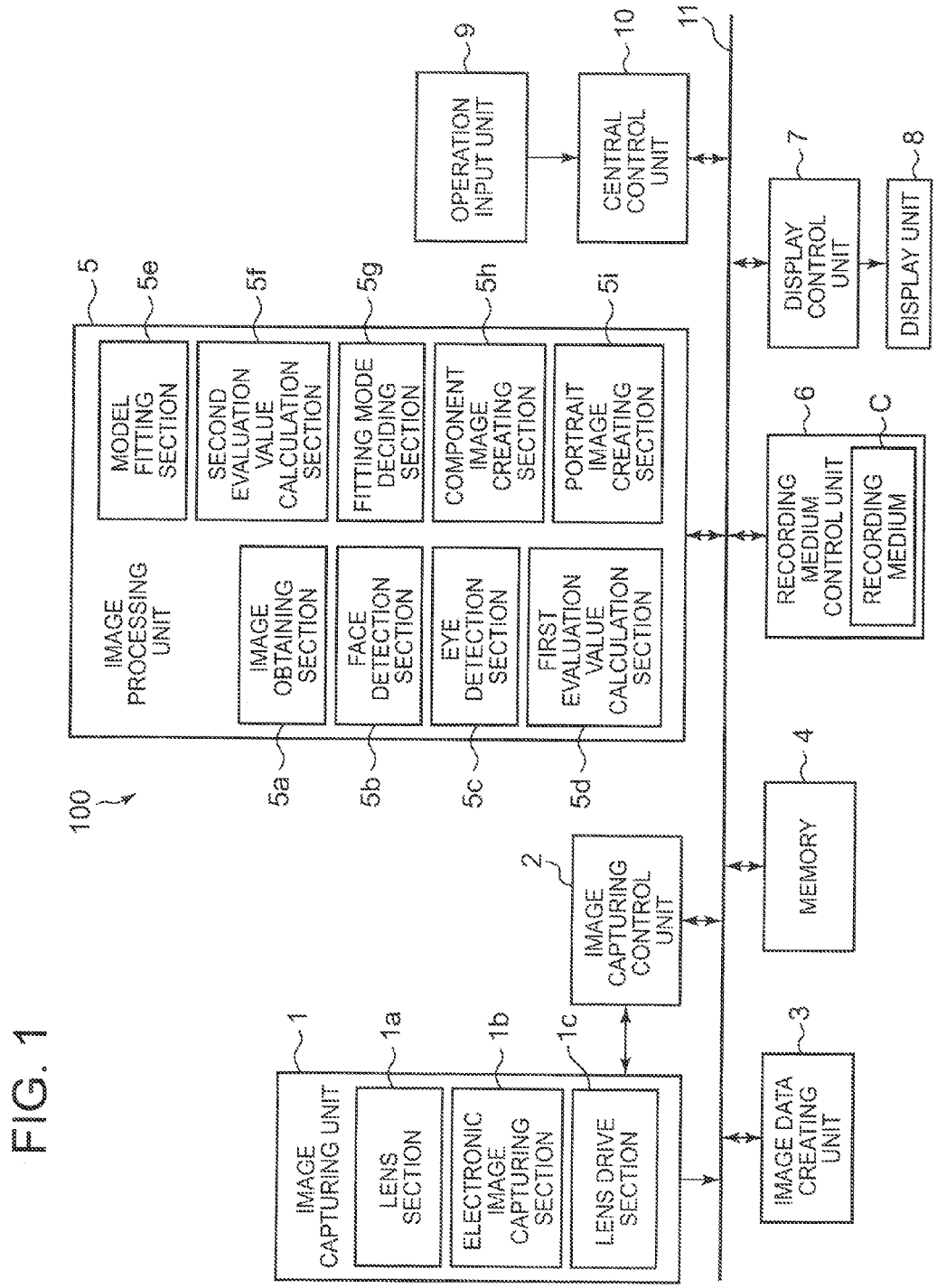
FIG. 1 is a block diagram showing a schematic configuration of an image capturing apparatus of the first embodiment where the present invention is applied.

Hereinafter, a specific embodiment of the present invention will be described with reference to the drawings. However, the scope of the present invention is not limited to the examples shown in the drawings.

FIG. 1 is a block diagram showing a schematic configuration of the image capturing apparatus 100 according to the first embodiment where the present invention is applied.

As shown in FIG. 1, the image capturing apparatus 100 of the embodiment includes an image capturing unit 1, an image capturing control unit 2, an image data creating unit 3, a memory 4, an image processing unit 5, a recording medium control unit 6, a display control unit 7, a display unit 8, an operation input unit 9, a central control unit 10 and such like, in particular.

The image capturing unit 1, the image capturing control unit 2, the image data creating unit 3, the memory 4, the image processing unit 5, the recording medium control unit 6, the display control unit 7 and the central control unit 10 are connected with one another via the bus line 11.

The image capturing unit 1 generates a frame image by capturing a specific subject.

In particular, the image capturing unit 1 includes a lens section 1a, an electronic image capturing section 1b and a lens drive section 1c.

The lens section 1a is constituted of a plurality of lenses such as a zoom lens and a focus lens, for example.

The electronic image capturing section 1b is constituted of an image sensor (image capturing element) such as a CCD (Charged Coupled Device) or a CMOS (Complementary Metal-oxide Semiconductor), for example. Further, the electronic image capturing section 1b converts the optical image which passed various lenses of the lens section 1a into a two dimensional image signal.

The lens drive section 1c includes a zoom drive unit which moves the zoom lens in the optical axis direction and a focus drive unit which moves the focus lens in the optical axis direction, for example, although they are omitted in the drawings.

Here, in addition to the lens section 1a, the electronic image capturing section 1b and the lens drive section 1c, the image capturing unit 1 may include a diaphragm (not shown in the drawing) which adjusts the amount of light that passes through the lens section 1a.

The image capturing control unit 2 controls the image capturing of a specific subject by the image capturing unit 1. That is, although omitted in the drawings, the image capturing control unit 2 includes a timing generator, a driver and the like. The image capturing control unit 2 scan drives the electronic image capturing section 1b by the timing generator and the driver, converts the optical image which passed through the lens section 1a into a two dimensional image signal every predetermined cycle by the electronic image capturing section 1b, reads out frame images, one by one, forms the image capturing region of the electronic image capturing section 1b and outputs the read frame images to the image data creating unit 3.

Here, the image capturing control unit 2 may adjust the focus position of the lens section 1a by moving the electronic image capturing section 1b in the optical axis direction instead of the focus lens of the lens section 1a.

Further, the image capturing control unit 2 may carry out an adjustment control which is a condition for capturing an image of a specific subject in such as AF (automatic focus processing), AE (automatic exposure processing), AWB (automatic white balance) or the like.

After the image data creating unit 3 performs an arbitrary gain adjustment on each of the color components of RGB with respect to a signal of analog value of a frame image transmitted from the electronic image capturing section 1b, the image data creating unit 3 converts the signal of analog value into digital data by the A/D converter (not shown in the drawing) by performing sample holding on the signal of analog value by a sample holding circuit (not shown in the drawing), performs color processing including pixel interpolation and γ correction on the digital data by the color processing circuit (not shown in the drawing), and then, generates the brightness signal Y and the color difference signals Cb, Cr (YUV data) of the digital value.

The brightness signal Y and the color difference signals Cb, Cr which are output from the color processing circuit are transmitted to the memory 4, which is used as a buffer memory, through DMA transmission via the DMA controller (not shown in the drawing).

The memory 4 is constituted of a DRAM (Dynamic Random Access Memory) or the like, for example, and in the memory 4, data and the like which are processed by the image processing unit 5, the central control unit 10 and the like are temporarily stored.

The image processing unit 5 includes an image obtaining section 5a, a face detection section 5b, an eye detection section 5c, a first evaluation value calculation section 5d, a model fitting section 5e, a second evaluation value calculation section 5f, a fitting mode deciding section 5g, a component image creating section 5h and a portrait image creating section 5i.

Each section in the image processing unit 5 is constituted of a predetermined logic circuit, for example. However, such configuration is an example and is not limitative in any way.

The image obtaining section 5a obtains an image which is the processing target in the face component extraction process.

Figure 3:
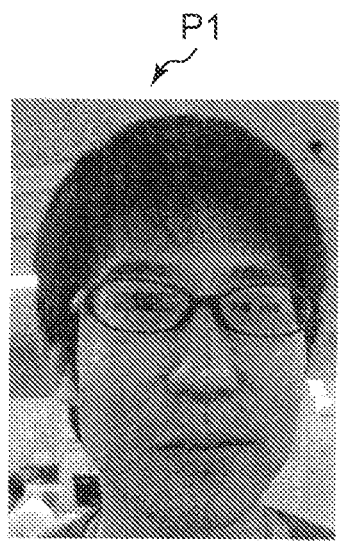
FIG. 3 is a schematic diagram showing an example of an image according to the portrait image creating process of FIG. 2.

That is, the image obtaining section 5a obtains image data of the image P1 (for example, a photograph image or the like) which is the original image. In particular, the image obtaining section 5a obtains a copy of image data (RGB data or YUV data) of the image P1 which is created by the image data creating unit 3 by the image capturing unit 1 and the image capturing control unit 2 capturing an image of a specific subject (for example, the face of a person) or obtains a copy of image data of the image P1 which is recorded in the recording medium M (see FIG. 3).

Here, the after-mentioned processes of the image processing unit 5 may be performed with respect to the image data of the image P1 itself or may be performed with respect to image data of a predetermined size (for example, VGA size or the like) where the image data of the image P1 is reduced at a predetermined ratio as needed.

The following description is given assuming that the image data of the image P1 is the image data expressing the pixel value of each pixel (for example, the brightness value) in 8 bit (265 tones).

The face detection section 5b detects the face region F in the image P1.

That is, the face detection section 5b detects the face region F in the image P1 which is obtained by the image obtaining section 5a. In particular, the face detection section 5b performs the face detection process using a predetermined algorithm on the image P1. For example, the face detection section 5b creates a plurality of detection candidate regions of a predetermine size (for example, 24×24 pixels) as candidate regions for the face region F with the image P1 being the processing target. Then, the face detection section 5b calculates the degree of similarity between the image data of each detection candidate region and the image data of a predetermined reference image by using the adaboost output calculation and specifies the image data of the detection candidate region having the calculated degree of similarity that exceeds a predetermined threshold as the image data of the face region F (see FIG. 4A and the like).

Here, the detail of the face detection process performed by the face detection section 5b is an example and is not limitative in any way. The process can be arbitrarily modified.

The eye detection section 5c detects the eye regions E corresponding to the eyes in the image P1.

That is, the eye detection section 5c detects a plurality of combinations of eye regions E and E, each combination making a pair, corresponding to the pair of eyes in the face region in the image P1 obtained by the image obtaining section 5a. In particular, the eye detection section 5c performs an eye detection process with respect to the face region F which is detected by the face detection section 5b to detect pairs of eye regions E and E.

In the eye detection process, for example, the eye detection section 5c sets the image of the rectangle portion corresponding to the face region F which is detected by the face detection process as the process target image and converts the image into a gray scale image of 256 tones. Further, the eye detection section 5c sequentially generates reduced images of predetermined sizes (for example, 80×80, 72×72, 64×64, 56×56, 48×48 pixels) which are formed by reducing the horizontal (x axis) and the vertical (y axis) of the gray scale image at predetermined ratios.

Further, the eye detection section 5c sets each reduced image of a predetermined size as the process target and detects eye candidate points by using an eye detection filter (for example, a ring filter). In particular, the eye detection section 5c assumes that it is a part of an eye candidate point if the center of the region where the ring filter is applied has lower (that is, darker) brightness comparing to all of the edge sections in the region and outputs the intensity image "ring image" of the relevant coordinate. Then, the eye detection section 5c deforms the intensity image "ring image" which is output from each reduced image of a predetermined size so as to be in the same predetermined size (for example, 80×80 pixels) and creates one composite image where the intensity images "ring images" are combined together.

The eye detection section 5c calculates the position coordinates of the centers (shown by "+" signs in the drawing) of the plurality of intensity images "ring images" in the composite image and specifies them as the eye candidates. At this time, the eye detection section 5c calculates the maximum brightness values of the intensity images "ring images" and stores them in the predetermined storage unit with association to the eye candidates.

Then, the eye detection section 5c selects any two points in the plurality of eye candidate points and assumes them as one pair of eye regions E and E. Further, if three or more points are specified as the eye candidate points, the eye detection section 5c assumes all possible combinations thereof as pairs of eye regions E and E.

Here, the detail of the eye detection process performed by the eye detection section 5c is an example and is not limitative in any way. The process can be modified arbitrarily.

The first evaluation value calculation section 5d calculates the first evaluation value relating to likeness to eyes.

That is, the first evaluation value calculation section 5d calculates the first evaluation values relating to the likeness to eyes with respect to the plurality of pairs of the eye regions E and E detected by the eye detection section 5c.

In particular, the first evaluation value calculation section 5d calculates the first evaluation values expressing the likeness to eyes by using a predetermined arithmetic expression with respect to the plurality of pairs of eye regions E and E detected by the eye detection section 5c. For example, the first evaluation value calculation section 5d calculates the first evaluation values according to the arithmetic expression so that the greater the distance to the average position of eyes which is the reference, the lower the evaluation value and the greater the maximum brightness value corresponding to the eye candidate points, the greater the evaluation value. The first evaluation value calculation section 5d specifies a number (for example, three) of evaluation values in the calculated first evaluation values in descending order of the evaluation value, and the first evaluation value calculation section 5d stores the first evaluation values and the position coordinates of the pairs of eye regions E and E in the predetermined storage unit in association with each other.

Here, the detail of the calculation process of the first evaluation values performed by the first evaluation value calculation section 5d is an example and is not limitative in any way. The calculation process can be modified arbitrarily.

The model fitting section 5e fits a plurality extraction models M in the image P1.

That is, the model fitting section 5e fits a plurality of extraction models M, which are for extracting a plurality of face components that constitute a face, in the image P1 on the basis of a number of pairs of eye regions E and E whose first evaluation values are equal to or greater than a predetermined value, the first evaluation values being calculated by the first evaluation value calculation section 5d. At this time, the model fitting section 5e may fit a plurality of extraction models M in the image P1 on the basis of the detection result of the face region F by the face detection section 5d in addition to the detection result of the eye regions E by the eye detection section 5c.

In particular, the model fitting section 5e sets the highest first evaluation value among the plurality of first evaluation values calculated by the first evaluation value calculation section 5d as the reference and specifies a number of pairs of eye regions E and E whose evaluation values are equal to or greater than a predetermined value.

For example, the model fitting section 5e compares the number of the first evaluation values which are calculated by the first evaluation value calculation section 5d to each other and specifies the highest first evaluation value among them. Then, the model fitting section 5e fits a plurality of extraction models M in the image P1 on the basis of the pair of eye regions E and E associated with the highest first evaluation value.

Further, the model fitting section 5e specifies the second highest first evaluation value among the number of first evaluation values which are calculated by the first evaluation value calculation section 5d and determines whether the specified first evaluation value (the second highest first evaluation value) has the evaluation value that is equal to or greater than a predetermined rate (for example, 80%) with respect to the highest evaluation value. Then, the model fitting section 5e fits a plurality of extraction models M in the image P1 on the basis of the pair of eye regions E and E which is associated with the first evaluation value determined as having the evaluation value that is equal to or greater than the predetermined rate.

The model fitting section 5e repeats the process so that the fitting modes of the plurality of extraction models M be a number (for example, three).

The fitting process of a plurality of extraction models M in the image P1 which is performed by the model fitting section 5e will be described.

In particular, as described later, the image processing unit 5 extracts face components from the image P1 by a detail extraction process using AAM (Active Appearance Model), for example, and the model fitting section 5e searches for the parts where the plurality of extraction models M match (fit) in the image P1, the plurality of extraction models M being arranged in the face regions F of the image P1 in the AAM.

Here, AAM is a method of modeling visual events and is a process for modeling an arbitrary image of a face region F. For example, as described later, the component image creating section 5h in the image processing unit 5 registers the statistical analysis results of the positions and pixel values (for example, brightness values) of a predetermined feature points (for example, tails of eyes, tip of a nose, face line and the like) in a plurality of sample face images in a predetermined registration unit. Then, the component image creating section 5h simulates the image of the face region F by using various types of models which are set by the positions of the above feature points being the references, that is, by using the shape models (extraction models M) expressing the shapes of the face components and the texture model expressing the "Appearance" in the average shapes.

At this time, the model fitting section 5e sets the initial positions of the plurality of extraction models M corresponding to the plurality of face components, that is, the extraction models M corresponding to a pair of eyes, eyebrows, a nose, a mouth, a face contour (especially, a jaw contour) and the like in the image P1. In particular, the model fitting section 5e sets the initial positions of the plurality of extraction models M so that a pair of eye extraction models M1 and M1 for extracting a pair of eyes overlap the position of the pair of eye regions E and E in the image P1, the eye regions E and E being detected by the eye detection section 5c. That is, the model fitting section 5e decides the positions of the eye detection models M1 and M1 which form a pair (the initial positions) so as not to change the relative positional relationship of the plurality of extraction models M by performing homologous deformation on the plurality of extraction models M as one because the relative positional relationship and spaces are set in advance to the reference condition for the plurality of extraction models M corresponding to the plurality of face components. Further, in addition to the positions of the eye regions E and E which form a pair and which are detected by the eye detection section 5c, in the image P1, the model fitting section 5e may decide the positions (the initial arrangements) of the eye extraction models M1 and M1 which form a pair by setting the intersection position where the straight line which is orthogonal to the straight line that connects the centers of the pair of eye regions E and E intersects the jaw side line of the rectangle of the face region F as the reference.

Figure 4A:
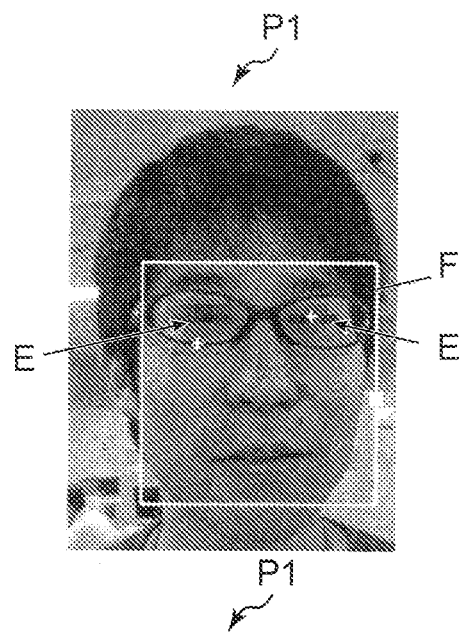
FIG. 4A is a schematic diagram showing an example of an image according to the portrait image creating process of FIG. 2.
Figure 4B:
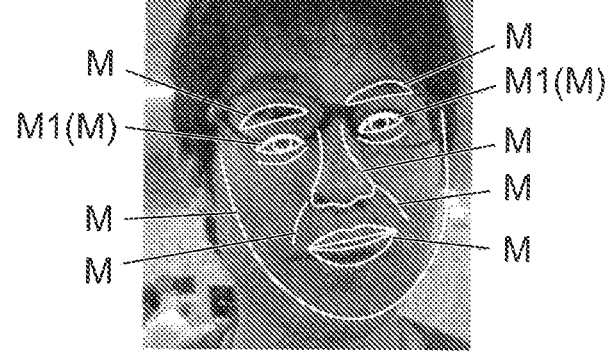
FIG. 4B is a schematic diagram showing an example of an image according to the portrait image creating process of FIG. 2.

In such way, the positions (the initial arrangement) where the plurality of extraction models M corresponding to other face components (for example, the mouth) fit in the image P1 are also decided (see FIG. 4B, for example).

Figure 4C:
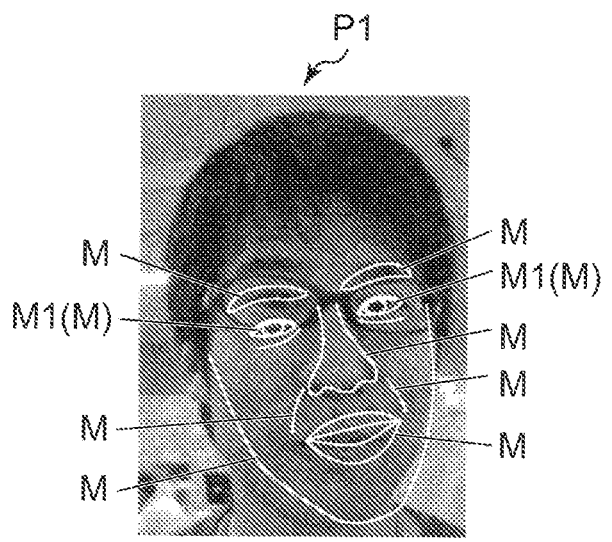
FIG. 4C is a schematic diagram showing an example of an image according to the portrait image creating process of FIG. 2.

Then, the model fitting section 5e searches a region where individual extraction models M best fit by individually deforming the shapes, sizes and the like of the plurality of extraction models M (see FIG. 4C, for example).

Here, data of individual extraction models M is data including information relating to shapes and colors. However, in FIG. 4B and others, only the outlines of the extraction models M and the contours thereof are schematically shown.

The second evaluation value calculation section 5f calculates the second evaluation values relating to the fitting condition of the plurality of extraction models M.

That is, the second evaluation value calculation section 5f calculates the second evaluation values relating to the fitting condition of the plurality of extraction models M which are fit by the model fitting section 5e according to a predetermined arithmetic expression for each of the number of pairs of eye regions E and E. In particular, for example, every time a plurality of extraction models M are fitted in the image P1 by the model fitting section 5e by setting each of the number of pairs of eye regions E and E as the reference, the second evaluation value calculation section 5f calculates the second evaluation value relating to the fitting condition of the plurality of extraction models M by setting the shifting amounts in pixel value and positional coordinate with respect to the matching region corresponding to each of the extraction models M as reference. Then, the second evaluation value calculation section 5f stores the calculated second evaluation values in the predetermined storage unit so as to be associated with the pairs of eye regions E and E.

Here, the calculation method of the second evaluation values performed by the second evaluation value calculation section 5f is a well known technique. Therefore, its detail description will be omitted. Further, the detail of the calculation process of the second evaluation values is an example and is not limitative in any way. The calculation process can be modified arbitrarily.

The fitting mode deciding section 5g decides the fitting mode of the plurality of extraction models M.

That is, the fitting mode deciding section 5h decides the fitting mode of the plurality of extraction models M to be fitted by the model fitting section 5e on the basis of the calculation results of the number of second evaluation values by the second evaluation value calculation section 5f. In particular, the fitting mode deciding section 5g, for example, specifies the highest second evaluation value by comparing the number of second evaluation values calculated by the second evaluation value calculation section 5f and specifies the fitting mode of the plurality of extraction models M corresponding to the highest second evaluation value as the fitting mode for the detail extraction process (AAM).

Here, the deciding method of the fitting mode of the plurality of extraction models M is an example and is not limitative in any way. The deciding method can be modified arbitrarily. For example, the fitting mode deciding section 5g may decide the fitting mode of the plurality of extraction models M by the fitting mode desired by a user being selected and specified based on a predetermined operation performed on the operation input unit 9 by a user among the fitting mode of the plurality of extraction models M corresponding to a number of pairs of eye regions E and E whose second evaluation values are calculated.

The component image creating section 5h generates a face component image expressing main face components in a face.

That is, the component image creating section 5h generates a face component image (not shown in the drawings) of main components of the face in the image P1 based on the fitting mode of the plurality of extraction models M decided by the fitting mode deciding section 5g. In particular, the component image creating section 5h modelizes the image of the face region F by the detail extraction process (AAM) using the plurality of extraction models M decided by the fitting mode deciding section 5g, for example. Then, the component image creating section 5h creates a face detail image (not shown in the drawings) wherein the main components in the image P1 are extracted and expressed in lines.

Further, the component image creating section 5h creates a face component image in which the face components that exist inside the face contour in the face region F and the face components that contact the contour in lines. In particular, the component image creating section 5h specifies the pixels in the face detail image that contact the face contour and deletes the pixel groups which are outside the face contour among the pixels that are continuous from the specified pixels. That is, the component image creating section 5h deletes the parts outside of the face contour in the face detail image and maintains the parts that are inside the face contour and that contact the contour to generate the face component image including the part images of the main face components such as eyes, nose, mouth, eye brows and the like.

Here, as the detail extraction process, the process using AAM is exemplified. However, this process is an example and is not limitative in any way, and the process can be modified arbitrarily.

The portrait image creating section 5i creates a portrait image by using the face component image.

That is, the portrait image creating section 5i creates a portrait image (not shown in the drawings) of the image P1 by using the face component image generated by the component image creating section 5h. In particular, the portrait image creating section 5i specifies the positions to superimpose the part images of face components such as eyes, nose, mouth and eye brows, for example, inside the face contour of a predetermined hair style image and superimposes the part images of the face components on the specified positions to create image data of a portrait image which expresses the image P1 in a portrait style.

The portrait image creating section 5i may generate an image by applying predetermined colors to predetermined parts (for example, to the face components such as eyes, mouth and eye brows) in the portrait image.

The recording medium control unit 6 is configured so that the recording medium M can be attached and detached freely. The recording medium control unit 6 controls data reading from the inserted recording medium M and data writing into the recording medium M.

That is, the recording medium control unit 6 records the image data for recording which is encoded into a predetermined compression format (for example, JPEG format) by the encoding section (not shown in the drawings) in the image processing unit 5 in the recording medium M.

Here, the recording medium M is configured of a non-volatile memory (flash memory), for example. However, this is an example and is not limitative in any way. The recording medium can be modified arbitrarily.

The display control unit 7 controls the reading of the image data for display which is temporarily stored in the memory 4 and the displaying of the image data in the display unit 8.

In particular, the display control unit 7 includes a VRAM (Video Random Access Memory), a VRAM controller, a digital video encoder and such like. The digital video encoder reads out the brightness signal Y and the color difference signals Cb and Cr which are read out from the memory 4 and stored in the VRAM (not shown in the drawings) under the control of the central control unit 10 from the VRAM via the VRAM controller regularly, generates a video signal based on the read data and outputs the generated video signal to the display unit 8.

The display unit 8 is a liquid crystal display panel, for example, and displays an image which is captured by the image capturing unit 1 in the display screen according to the video signal from the display control unit 7. In particular, the display unit 8, in the still image capturing mode or in the video image capturing mode, displays live view images by sequentially updating a plurality of frame images, which are generated by the image capturing unit 1 and the image capturing control unit 2 capturing images of a specific subject, at a predetermined frame rate. Further, the display unit 8 displays images (rec-view images) which are recorded as still images and also displays images which are being recorded as video images.

The operation input unit 9 is for performing predetermined operation of the image capturing apparatus 100. In particular, the operation input unit 9 includes operation sections such as a shutter button relating to the instruction to capture an image of a subject, a selection OK button relating to the instruction to select the image capturing mode, a function and the like and a zoom-in button relating to the instruction to adjust the zooming (all of them are not shown in the drawings). The operation input unit 9 outputs a predetermined operation signal according to an operation of each button of the operation sections to the central control unit 19.

The central control unit 10 controls each unit in the image capturing apparatus 100. In particular, the central control unit 10 includes a CPU (Central Processing Unit) (not shown in the drawings), for example. The central control unit 10 performs various control operations according to various processing programs (not shown in the drawings) of the image capturing apparatus 100.

Next, the portrait image creating process performed in the image capturing apparatus 100 will be described with reference to FIGS. 2 to 6.

Figure 2:
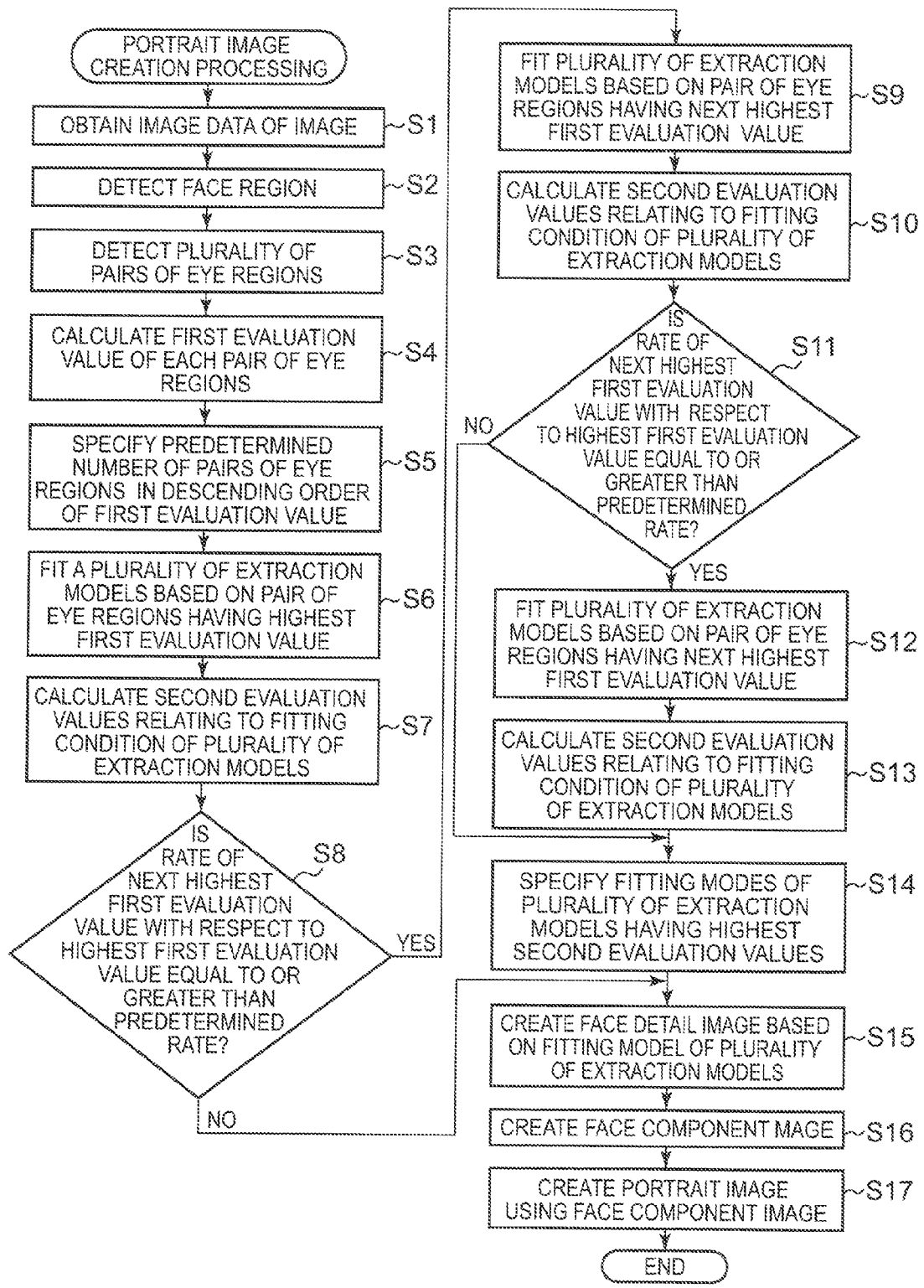
FIG. 2 is a flowchart which shows an example of the operation of the portrait image creating process performed by the image capturing apparatus of FIG. 1.

FIG. 2 is a flowchart showing an example of an operation according to the portrait image creating process.

The portrait image creating process is a process which is performed by each unit in the image capturing apparatus 100, especially by the image processing unit 5, under the control of the central control unit 10 in a case where the portrait image creating mode is selected in a plurality of operation modes which are displayed in the menu screen based on the predetermined operation performed by a user on the selection OK button in the operation input unit 9.

The image data of the image P1 which is to be the processing target of the portrait image generation process is assumed as being recorded in the recording medium M in advance.

As shown in FIG. 2, first, the recording medium control unit 6 reads out the image data of the image P1 (see FIG. 3) which is specified based on the predetermined operation performed by a user on the operation input unit 9 among the image data recorded in the recording medium M and then, the image obtaining section 5a in the image processing unit 5 obtains the read image data as the processing target of the portrait image creating process (step S1).

Next, the face detection section 5b performs the face detection process using a predetermined algorithm (for example, adaboost) on the image data of the image P1 which is obtained by the image obtaining section 5a and specifies the image data of the face region F (step S2; see FIG. 4A, for example).

Thereafter, the eye detection section 5c performs the eye detection process for detecting a pair of eye regions E and E that corresponds to a pair of eyes on the image data of the face region F which is detected by the face detection section 5b (step S3). In such way, the eye detection section 5c detects a plurality of pairs of eye regions E and E as candidate regions in the face region F in the image P1 (see FIGS. 4A, 5A and 6A).

Figure 6A:
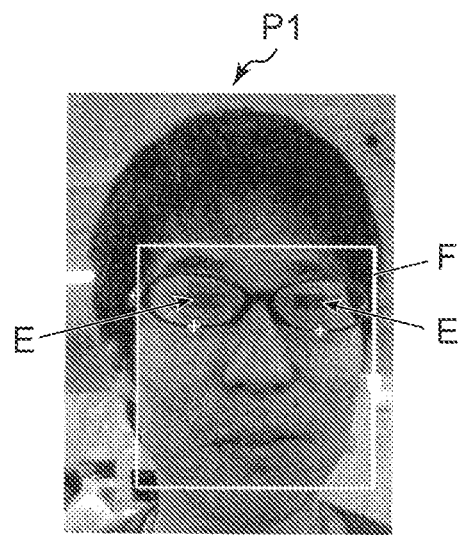
FIG. 6A is a schematic diagram showing an example of an image according to the portrait image creating process of FIG. 2.
Figure 6B:
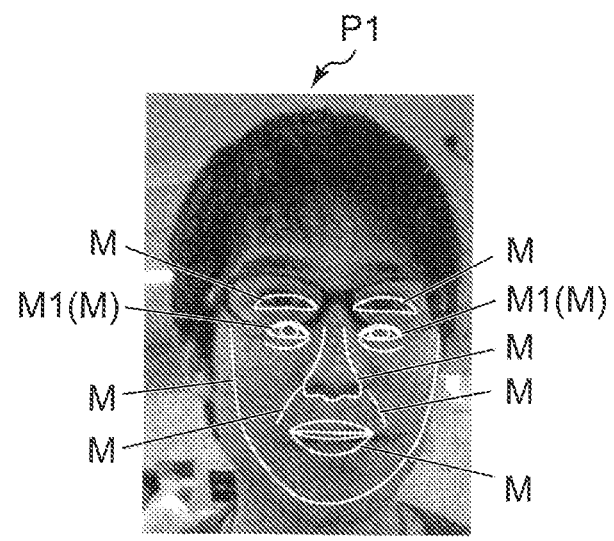
FIG. 6B is a schematic diagram showing an example of an image according to the portrait image creating process of FIG. 2.
Figure 6C:
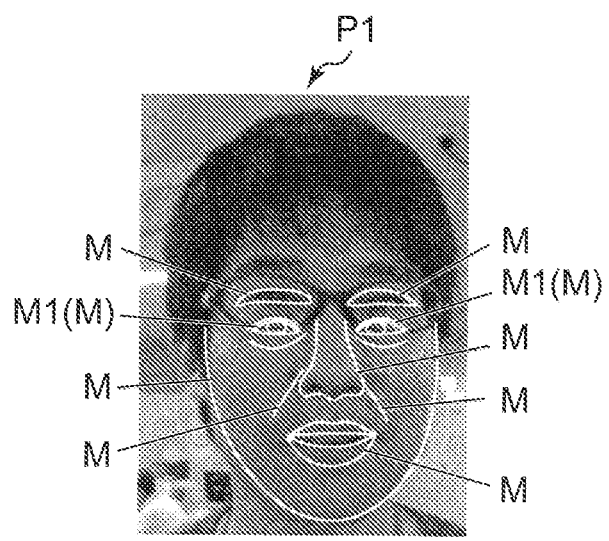
FIG. 6C is a schematic diagram showing an example of an image according to the portrait image creating process of FIG. 2.

FIG. 4A schematically shows a false detection state where the center of one eye region E of the pair of eye regions E and E is detected at the edge of glasses. FIG. 6A schematically shows a false detection state where the centers of the both eye regions E and E, which forms a pair, are detected at the edges of glasses.

The first evaluation value calculation section 5d calculates the first evaluation values that indicates the likeness to eyes respectively for the plurality of pairs of eye regions E and E which are detected by the eye detection section 5c (step S4). Thereafter, the first evaluation value calculation section 5d specifies a number (for example, three) of calculated first evaluation values in descending order and stores the specified first evaluation values and the positional coordinates of the pairs of eye regions E and E in a predetermined storage unit so as to be associated to each other (step S5).

Figure 5A:
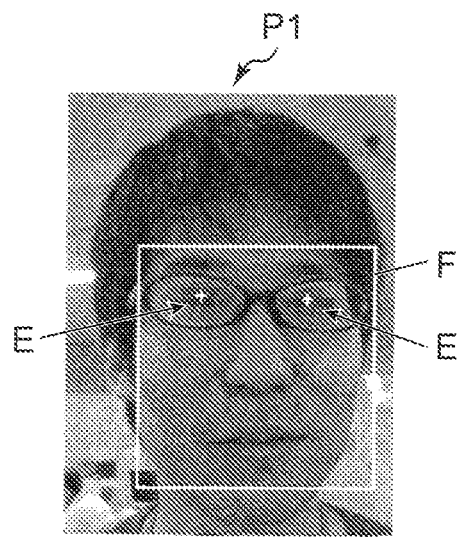
FIG. 5A is a schematic diagram showing an example of an image according to the portrait image creating process of FIG. 2.
Figure 5B:
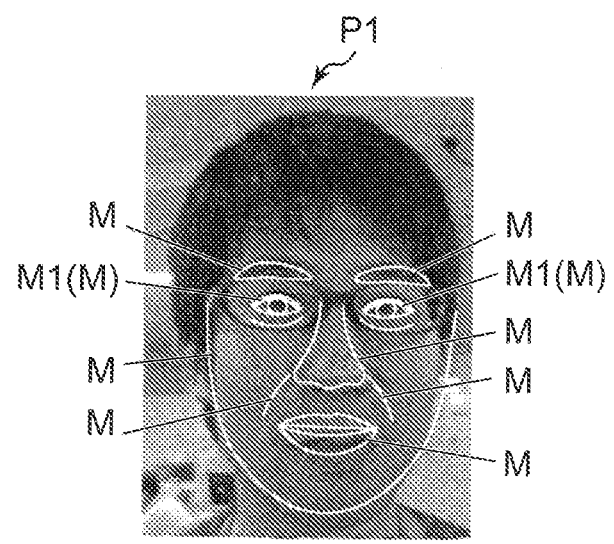
FIG. 5B is a schematic diagram showing an example of an image according to the portrait image creating process of FIG. 2.

With respect to the first evaluation value which is calculated for one pair of eye regions E and E, for example, the first evaluation value of the pair of eye regions E and E shown in FIG. 4A has the highest value, the first evaluation value of the pair of eye regions E and E shown in FIG. 5A has the second highest value and the first evaluation value of the pair of eye regions E and E shown in FIG. 6A has the third highest value.

Next, the model fitting section 5e fits a plurality of extraction models M in the image P1 based on the pair of eye regions E and E (see FIG. 4A) which is associated with the highest first evaluation value among the plurality of first evaluation values calculated by the first evaluation value calculation section 5d (step S6). In particular, the model fitting section 5e sets the initial arrangement of a plurality of extraction models M so that the pair of eye detection models M1 and M1 overlap the positions of the eye regions E and E which form the pair in the image P1 (see FIG. 4B). Then, the model fitting section 5e searches for the region where the extraction models M best fit in the face region F in the image P1 by deforming the shapes, sizes and the like of individual extraction models M and outputs the fitting results to the second evaluation value calculation section 5f (see FIG. 4C).

Thereafter, the second evaluation value calculation section 5f calculates the second evaluation value relating to the fitting conditions of the plurality of extraction models M which are fitted by the model fitting section 5e according to a predetermined arithmetic expression and stores the calculated second evaluation value and the pair of eye regions E and E in a predetermined storage unit so as to be associated to each other (step S7).

Next, the model fitting section 5e specifies the second highest first evaluation value and determines whether the rate of the specified second highest first evaluation value with respect to the highest first evaluation value is equal to or greater than a predetermined rate (for example 80%) (step S8).

If it is determined that the rate of the second highest first evaluation value with respect to the highest first evaluation value is equal to or greater than a predetermined rate in step S8 (step S8; YES), the model fitting section 5e fits the plurality of extraction models M in the image P1 based on the pair of eye regions E and E which is associated with the second highest first evaluation value (see FIG. 5A) (step S9).

The process of fitting the plurality of extraction models M performed here is similar to the process in step S6. In particular, the model fitting section 5e sets the initial arrangement of the plurality of extraction models M (see FIG. 5B) and thereafter, searches for the region where the extraction models M best fit in the face region F in the image P1 by deforming the shapes, sizes and the like of the individual extraction models M (see FIG. 5C).

Similarly to the process of step S7, the second evaluation value calculation section 5f calculates the second evaluation value indicating the fitting condition of the plurality of extraction models M according to a predetermined arithmetic expression and stores the calculated second evaluation value and the pair of eye regions E and E in the predetermined storage unit so as to be associated to each other (step S10).

Next, the model fitting section 5e specifies the third highest first evaluation value and determines whether the rate of the specified third highest first evaluation value with respect to the highest first evaluation value is equal to or greater than a predetermined rate (for example, 80%) (step S11).

If it is determined that the rate of the third highest first evaluation value with respect to the highest first evaluation value is equal to or greater than the predetermined rate in step S11 (step S11; YES), the model fitting section 5e fits the plurality of extraction models M in the image P1 based on the pair of eye regions E and E (see FIG. 6A) which is associated with the third highest first evaluation value (step S12).

The process of fitting the plurality of extraction models M performed here is similar to the processes in steps S6 and S9. In particular, the model fitting section 5e sets the initial arrangement of the plurality of extraction models M (see FIG. 6B) and thereafter, searches for the region where the extraction models M best fit in the face region F in the image P1 by deforming the shapes and sizes of the individual extraction models M (see FIG. 6C).

Similarly to the processes of steps S7 and S10, the second evaluation value calculation section 5f calculates the second evaluation value relating to the fitting condition of the plurality of extraction models M according to a predetermined arithmetic expression and stores the calculated second evaluation value in the predetermined storage unit so as to be associated with the pair of eye regions E and E (step S13).

Figure 5C:
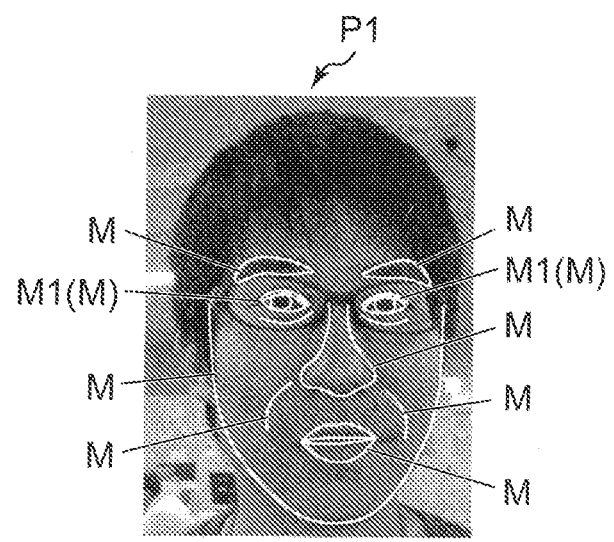
FIG. 5C is a schematic diagram showing an example of an image according to the portrait image creating process of FIG. 2.

Thereafter, the fitting mode deciding section 5g obtains the three second evaluation values which are calculated from the predetermined storage unit, specifies the highest second evaluation value by comparing the second evaluation values to each other and specified the fitting modes of the plurality of extraction models M associated with the highest second evaluation value (for example, the fitting mode of the plurality of extraction models M in FIG. 5C) (step S14).

Even if it is determined that the rate of the third highest first evaluation value is not equal to or greater than the predetermined rate in step S11 (step S11; NO), the fitting mode deciding section 5g obtains two second evaluation values which are calculated from the predetermined storage unit, specifies the highest second evaluation value by comparing the second evaluation values and specifies the fitting mode of the plurality of execution models M associated with the specified second evaluation value (step S14).

Then, the component image creating section 5h performs the detail extraction process (AAM) based on the fitting mode of the plurality of extraction models M decided by the fitting mode deciding section 5g and creates a face component image (not shown in the drawings) relating to the main components of the face in the image P1 (step S15). In such way, the component image creating section 5h creates the face detail image in which the face components (for example, eyes, nose, mouth, eye brows, hair and face contour) are expressed in lines.

If it is determined that the rate of the second highest first evaluation value is not equal to or greater than the predetermined rate with respect to the highest first evaluation value in step S8 (step S8; NO), the component image creating section 5$h$ performs the detail extraction process (AAM) based on the fitting mode (see FIG. 4C) of the plurality of extraction models M corresponding to the pair of eye regions E and E (see FIG. 4A) associated with the highest first evaluation value and creates a face component image relating to the main components of the face in the image P1 (step S15).

Next, the component image creating section 5$h$ specifies the face contour in the face region F by the detail extraction process and creates a face component image including the face components inside the face contour and the face components contacting the contour, that are, part images of the main face components such as eyes, nose, mouth and eye brows, for example (step S16).

Thereafter, the portrait image creating section 5$i$ creates a portrait image of the image P1 by using the face component image (step S17). In particular, the portrait image creating section 5$i$ obtains a predetermined hair style image, specifies the positions inside the face contour of the hairstyle image where the part images of the face components, such as eyes, nose, mouth and eye brows, are to be superimposed, and superimposes the part images of the face components onto the positions to create image data of a portrait image that expresses the image P1 in a portrait style.

Then, the recording medium control unit 6 obtains and records the image data (YUV data) of the portrait image created by the portrait image creating section 5$i$.

Hereby, the portrait image creation processing ends.

As described above, according to the image capturing unit 100 of the embodiment, a plurality of extraction models M for extracting a plurality of face components are fitted in the image P1 based on a number of pairs of eye regions E and E having the first evaluation values equal to or greater than a predetermined value, the first evaluation value being calculated for each of the plurality of pairs of eye regions E and E detected by the eye detection section 5$c$ and the first evaluation values relating to the likeness to eyes, and the second evaluation value relating to the fitting condition of the plurality of extraction models M are calculate for each of the number of pairs of eye regions E and E and the fitting mode of the plurality of extraction models M is decided based on the calculation results of the number of second evaluation values. Therefore, for example, even when a person in the image P1 is wearing a pair of glasses with thick dark color frame such as black rimmed glasses, appropriate fitting mode of the plurality of extraction models M can be decided by taking the second evaluation values relating to the fitting condition of the plurality of extraction models M associated with a number of pairs of eye regions E and E into consideration. That is, for example, there is a possibility that an eye region can be easily false detected because black rimmed glasses have a brightness value close to that of the black eye part and the initial arrangement of the plurality of extraction models M, the eye region E being the reference, cannot be performed appropriately (see FIG. 4B and FIG. 6B, for example). In view of this, not only the pair of eye regions E and E having the highest evaluation value (which is determined as being most likely eyes) detected in the face region F in the image P1 but also a number of pairs of eye regions E and E having evaluation values that are equal to or greater than a predetermined value specified by setting the highest first evaluation value as the reference are used for fitting a plurality of extraction models M, and the highest second evaluation value among the number of second evaluation values relating to the fitting conditions is specified. Then, by deciding the fitting mode of the plurality of extraction models M corresponding to the specified second evaluation value as the fitting mode for extracting the face components, the plurality of extraction models M can be fitted appropriately in the image P1.

Therefore, a plurality of face components can be extracted from the image P1 appropriately.

Because the face region F is detected in the image P1 and a pair of eye regions E and E corresponding the pair of eyes is detected in the detected face region F, a number of pairs of eye regions E and E can be detected appropriately and the plurality of extraction models M corresponding to the plurality of face components in the image P1 can be fitted appropriately based on the number of pairs of eye regions E and E. Especially, because the plurality of extraction models M are fitted in the image P1 based on the detection result of the face region F, the plurality of extraction models M can be fitted in the image P1 more properly by taking not only the detected results of the number of pairs of eye regions E and E but also the detection result of the face region F.

Further, because the face component image relating to the main components of the face in the image P1 is created based on the decided fitting mode of the plurality of extraction models M and the portrait image of the image P1 is created by using the face component image, the face component image can be created by extracting a plurality of face components by using the plurality of extraction models M which are properly fitted in the image P1. As a result, the portrait image can be created appropriately.

The present invention is not limited to the above described embodiment, and various modifications and design changes can be carried out within the scope of the present invention.

For example, in the above embodiment, the face component image relating to the main components of the face in the image P1 is created and the portrait image is created by using the face component image. However, there is no need for the face component image and the portrait image to be created, and whether the face component image and the portrait image are to be created or not can be changed arbitrarily.

Further, the configuration includes the recording medium control unit 6 to record the image P1. However, the configuration is not limited to this. For example, the configuration may be such that the image P1 is recorded in a predetermined server which is connectable with the apparatus main body via a predetermined communication network, and the image obtaining section 5$a$ obtains the image P1 from the server by accessing the predetermined server by a communication processing unit (not shown in the drawings) via a communication network.

The configuration of the image capturing apparatus 100 exemplified in the above described embodiment is an example, and the configuration is not limited in any way. Although the image capturing apparatus 100 is exemplified as the face component extraction device, the face component extraction device is not limited to this. The face component extraction device may be of any configuration as long as the face component extraction process according to the present invention can be executed.

In the above embodiment, the functions as the ways for eye detection, first calculation, fitting, second calculation and deciding are realized by driving of the eye detection section 5$c$, the first evaluation value calculation section 5$d$, the model fitting section 5$e$, the second evaluation value calculation section 5$f$ and the fitting mode deciding section 5$g$ under the control of the central control unit 10. However, the configuration is not limited to this. The above functions may be realized by predetermined programs and the like being executed by the central control unit 10.

That is, in the program memory (not shown in the drawings) that stores programs, programs including eye detection process routine, the first calculation process routine, the fitting process routine, the second calculation process routine deciding routine are stored. The eye detection process routine may make the CPU of the central control unit 10 function as a unit for detecting a plurality of combinations for pairs of eye regions E and E in the face region F in the image P1. Moreover, the first calculation process routine may make the CPU of the central control unit 10 function as a unit for calculating the first evaluation values relating to the likeness to eyes with respect to the plurality of number of pairs of eye regions E and E which are detected. The fitting process routine may make the CPU of the central control unit 10 function as a unit for fitting a plurality of extraction models M in the image P1 for extracting a plurality of face components that constitute a face based on a number of pairs of eye regions E and E whose calculated first evaluation values are equal to or greater than a predetermined value. The second calculation process routine may make the CPU of the central control unit 10 function as a unit for calculating the second evaluation value relating to the fitting condition of the plurality of extraction models M for each of a number of pairs of eye regions E and E. The deciding process routine may make the CPU of the central control unit 10 function as a unit for deciding the fitting mode of the plurality of extraction models M based on the calculation results of the number of second evaluation values.

Similarly, the ways of face detection, the first creating and the second creating may also be realized by the CPU of the central control unit 10 executing a predetermined programs, for example.

As a computer readable medium in which programs for executing the above processes are stored, a non-volatile memory such as a flash memory and a portable recording medium such as a CD-ROM may be applied in addition to a ROM, hard disk and the like. Further, as a medium for providing data of programs via a predetermined communication circuit, a carrier wave can be applied.

Few embodiments of the present invention are described above. However, the scope of the present invention is not limited to the embodiment.

The entire disclosure of Japanese Patent Application NO. 2012-254824 filed on Nov. 21, 2012 including description, claims, drawings, and abstract are incorporated herein by reference in its entirety.

What is claimed is:

1. A face component extraction apparatus, comprising:
a memory; and
a processor which is operable to function as:
an eye detection unit which detects a plurality of combinations of candidates of eye regions, each combination forming a pair, in a face region in an image;
a first calculation unit which calculates a first evaluation value for each pair of the candidates of the eye regions detected by the eye detection unit, each of the first evaluation values being related to a likeness to eyes;
a fitting unit which fits, into the face region in the image, a plurality of extraction model units for extracting a plurality of face components, respectively, based on pairs of the candidates of the eye regions whose first evaluation values are equal to or greater than a value, wherein each of the extraction model units has a plurality of extraction models corresponding to the plurality of the face components, respectively, and is set in accordance with a respective one of the pairs of the candidates of the eye regions;
a second calculation unit which calculates at least one second evaluation value corresponding to at least one of the pairs of the candidates of the eye regions, the at least one second evaluation value being related to a fitting condition between the plurality of extraction model units and the plurality of face components in the image; and
a deciding unit which decides one of the plurality of extraction model units in accordance with the at least one second evaluation value.

2. The face component extraction apparatus as claimed in claim 1, wherein the deciding unit specifies a highest second evaluation value from among the at least one second evaluation value calculated by the second calculation unit and decides the one of the plurality of extraction model units that corresponds to the highest second evaluation value.

3. The face component extraction apparatus as claimed in claim 1, wherein the fitting unit specifies the pairs of the candidates of the eye regions whose first evaluation values are equal to or greater than the value by setting a highest first evaluation value from among the plurality of first evaluation values calculated by the first calculation unit as a reference and fits, into the plurality of face components in the image, the plurality of extraction model units, respectively, based on each of the pairs of the candidates of the eye regions.

4. The face component extraction apparatus as claimed in claim 1, wherein the processor is further operable as a face detection unit which detects the face region in the image, and
wherein the eye detection unit detects the pair of the candidates of the eye regions corresponding to a pair of eyes in the face region detected by the face detection unit.

5. The face component extraction apparatus as claimed in claim 4, wherein the fitting unit fits, into the plurality of face components in the image, the plurality of extraction model units based on a detection result of the face region by the face detection unit.

6. The face component extraction apparatus as claimed in claim 1, wherein the processor is further operable as:
a first creating unit which creates a face component image relating to the plurality of face components based on the plurality of extraction models in the one of the plurality of extraction model units decided by the deciding unit; and
a second creating unit which creates a portrait image of the image by using the face component image generated by the first creating unit.

7. A face component extraction method using a face component extraction apparatus, the apparatus comprising a memory and a processor, the method being executed by the processor, and the method comprising:
detecting a plurality of combinations of candidates of eye regions, each combination forming a pair, in a face region in an image;
performing a first calculation for calculating a first evaluation value for each pair of the candidates of the eye regions detected by the detecting, each of the first evaluation values being related to a likeness to eyes;
fitting, into the face region in the image, a plurality of extraction model units for extracting a plurality of face components, respectively, based on pairs of the candidates of the eye regions whose calculated first evaluation values are equal to or greater than a value, wherein each of the extraction model units has a plurality of extraction models corresponding to the plurality of the face components, respectively, and is set in accordance with a respective one of the pairs of the candidates of the eye regions;

performing a second calculation for calculating at least one second evaluation value corresponding to at least one of the pairs of the candidates of the eye regions, the at least one second evaluation value being related to a fitting condition between the plurality of extraction model units and the plurality of face components in the image; and deciding one of the plurality of extraction model units in accordance with the at least one second evaluation value.

8. A non-transitory computer readable recording medium having a program stored thereon that is readable by a processor of a face component extraction apparatus, the apparatus further comprising a memory, and the program being executable to control the processor to function as:

an eye detection unit which detects a plurality of combinations of candidates of eye regions, each combination forming a pair, in a face region in an image;

a first calculation unit which calculates a first evaluation value for each pair of the candidates of the eye regions detected by the eye detection unit, each of the first evaluation values being related to a likeness to eyes;

a fitting unit which fits, into the face region in the image, a plurality of extraction model units for extracting a plurality of face components, respectively, based on pairs of the candidates of the eye regions whose first evaluation values are equal to or greater than a value, wherein each of the extraction model units has a plurality of extraction models corresponding to the plurality of the face components, respectively, and is set in accordance with a respective one of the pairs of the candidates of eye regions;

a second calculation unit which calculates at least one second evaluation value corresponding to at least one of the pairs of the candidates of the eye regions, the at least one second evaluation value being related to a fitting condition between the plurality of extraction model units and the plurality of face components in the image; and a deciding unit which decides of the plurality of extraction model units in accordance with the at least one second evaluation value.

* * * * *

UNITED STATES PATENT AND TRADEMARK OFFICE
CERTIFICATE OF CORRECTION

PATENT NO. : 9,323,981 B2
APPLICATION NO. : 14/051236
DATED : April 26, 2016
INVENTOR(S) : Hirokiyo Kasahara et al.

Page 1 of 1

It is certified that error appears in the above-identified patent and that said Letters Patent is hereby corrected as shown below:

In the Claims
Column 18, line 20, after "decides" insert --one--.

Signed and Sealed this
Nineteenth Day of July, 2016

Michelle K. Lee
*Director of the United States Patent and Trademark Office*